US007002748B1

(12) United States Patent
Conley et al.

(10) Patent No.: US 7,002,748 B1
(45) Date of Patent: Feb. 21, 2006

(54) METHOD OF PRODUCING A PACKAGE FROM A SHEET HAVING LENTICULAR LENS IN PRE-SELECTED AREAS

(76) Inventors: Kenneth E. Conley, 3308 Mikelynn La., Matthews, NC (US) 28105; Mary Ellen Conley, 3308 Mikelynn La., Matthews, NC (US) 28105; Max B. Smith, Jr., 6321 Golden Eagle La., Charlotte, NC (US) 28227

( * ) Notice: Subject to any disclaimer, the term of this patent is extended or adjusted under 35 U.S.C. 154(b) by 8 days.

(21) Appl. No.: 10/782,349

(22) Filed: Feb. 19, 2004

Related U.S. Application Data

(60) Provisional application No. 60/449,272, filed on Feb. 21, 2003.

(51) Int. Cl.
*G02B 27/10* (2006.01)

(52) U.S. Cl. .................................... 359/619; 359/900

(58) Field of Classification Search ................ 359/619, 359/620, 625, 626; 40/454, 539
See application file for complete search history.

(56) References Cited

U.S. PATENT DOCUMENTS

| | | | | |
|---|---|---|---|---|
| 3,241,429 | A * | 3/1966 | Rice et al. | 359/620 |
| 4,920,039 | A * | 4/1990 | Fotland et al. | 430/324 |
| 5,330,799 | A | 7/1994 | Sandor et al. | |
| 5,362,351 | A * | 11/1994 | Karszes | 156/243 |
| 5,488,451 | A * | 1/1996 | Goggins | 355/77 |
| 5,642,226 | A * | 6/1997 | Rosenthal | 359/619 |
| 5,644,431 | A * | 7/1997 | Magee | 359/619 |
| 5,812,152 | A * | 9/1998 | Torigoe et al. | 347/2 |
| 5,933,276 | A * | 8/1999 | Magee | 359/455 |
| 6,084,713 | A * | 7/2000 | Rosenthal | 359/619 |
| 6,369,949 | B1 * | 4/2002 | Conley | 359/619 |
| 6,373,636 | B1 * | 4/2002 | Conley | 359/619 |
| 6,493,972 | B1 * | 12/2002 | Williams | 40/454 |
| 6,596,361 | B1 | 7/2003 | Klein et al. | |
| 6,624,946 | B1 | 9/2003 | Franko, Sr. | |
| 6,741,395 | B1 * | 5/2004 | Johnson | 359/619 |
| 6,781,761 | B1 * | 8/2004 | Raymond | 359/619 |
| 2005/0000128 | A1 * | 1/2005 | Chen | 40/454 |

FOREIGN PATENT DOCUMENTS

| | | | |
|---|---|---|---|
| JP | 11049175 | A * | 2/1999 |

* cited by examiner

*Primary Examiner*—Ricky Mack
(74) *Attorney, Agent, or Firm*—Jason S. Miller

(57) ABSTRACT

A method of producing a package from lenticular sheet having anisotropic optical properties comprising the steps of providing a body of transparent material having a pair of opposing sides and an index of refraction greater than one; forming a plurality of lenses on the first side of said pair of opposing sides in pre-selected portions of the first side; forming a pre-determined package design from the lenticular sheet, and wherein the remainder of the first side of said pair of opposing sides outside the pre-selected lens portions is generally flat and transparent. A method of manufacturing a lenticular sheet comprising the steps of producing a transparent sheet by engraving a desired lens pattern over an entire cylinder or flat plate; placing a mask over selected lens areas; metal plating the unmasked areas to a thickness greater than the surface of the masked areas; cutting the plated areas back to the level of the masked areas; and forming a pre-determined package design from the lenticular sheet.

14 Claims, 12 Drawing Sheets

*Fig.2* (PRIOR ART)
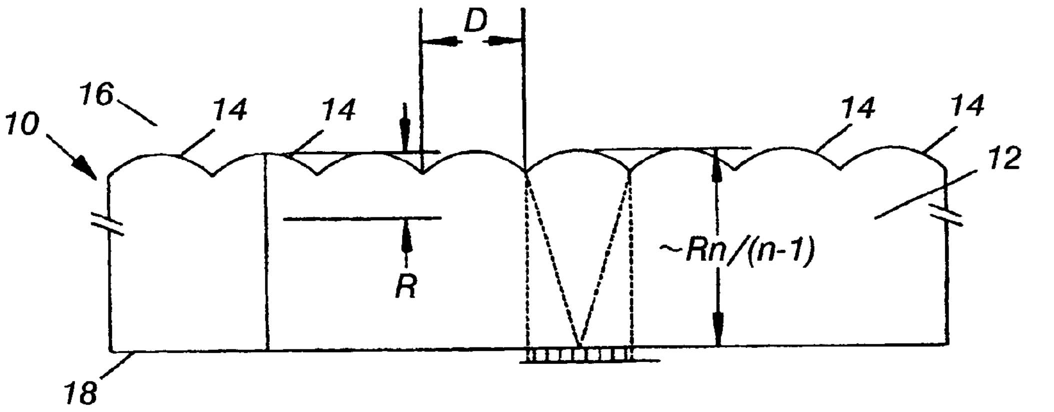
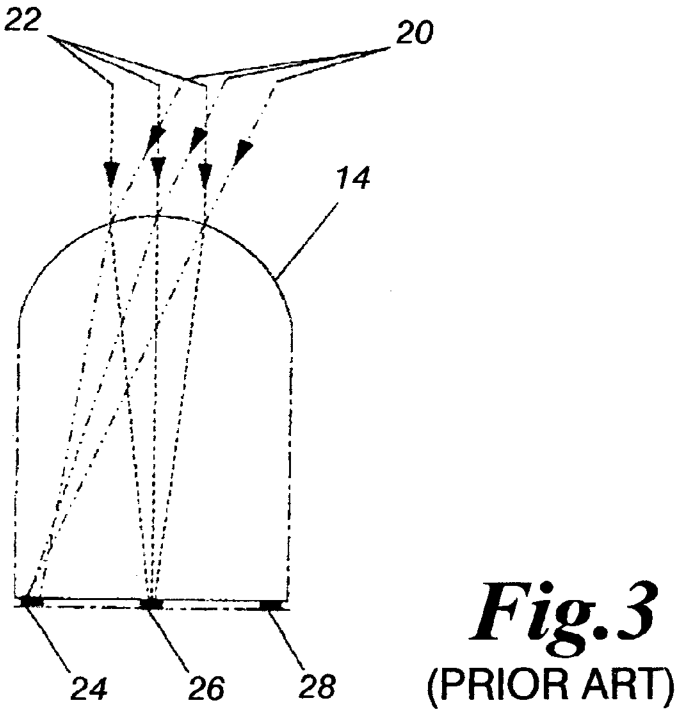
*Fig.3* (PRIOR ART)

Fig. 6
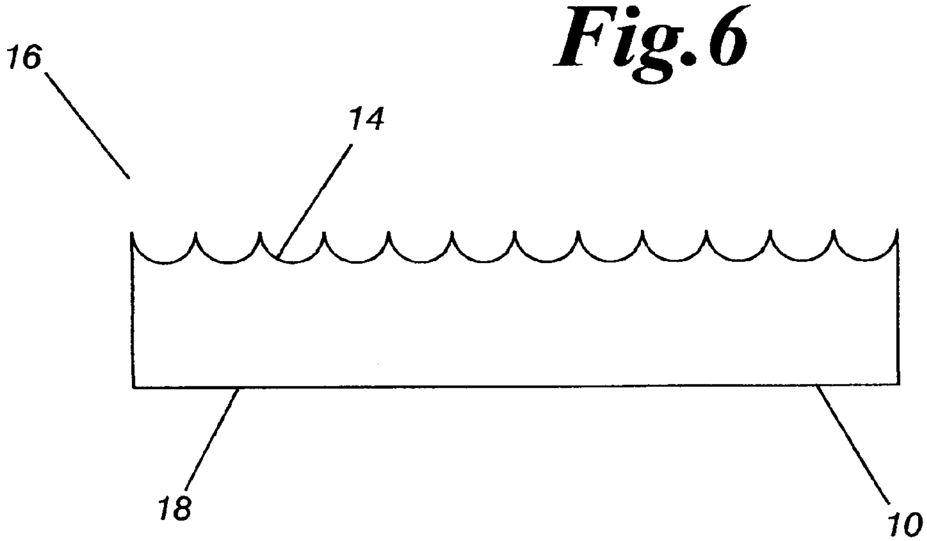
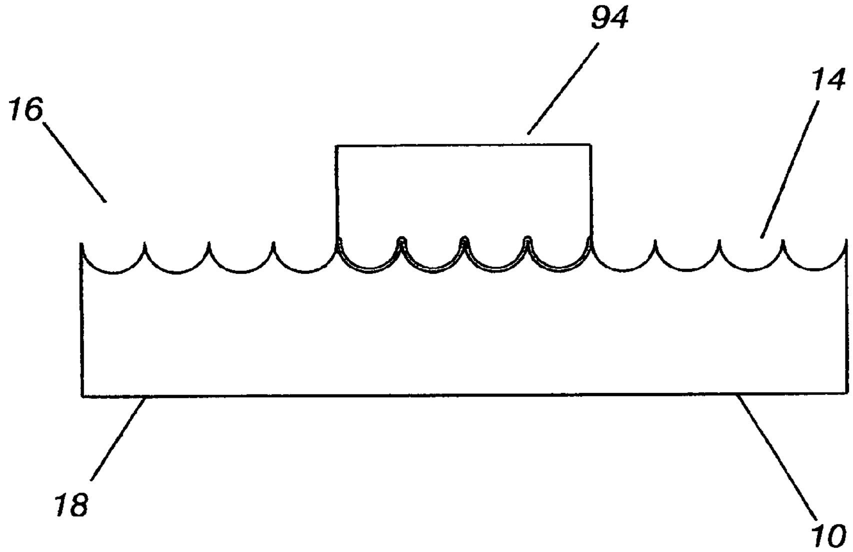
Fig. 7

Fig.10
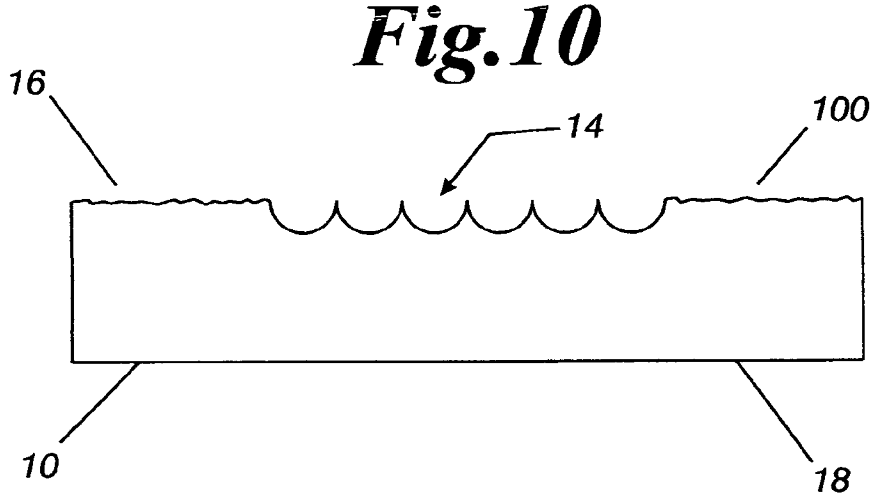
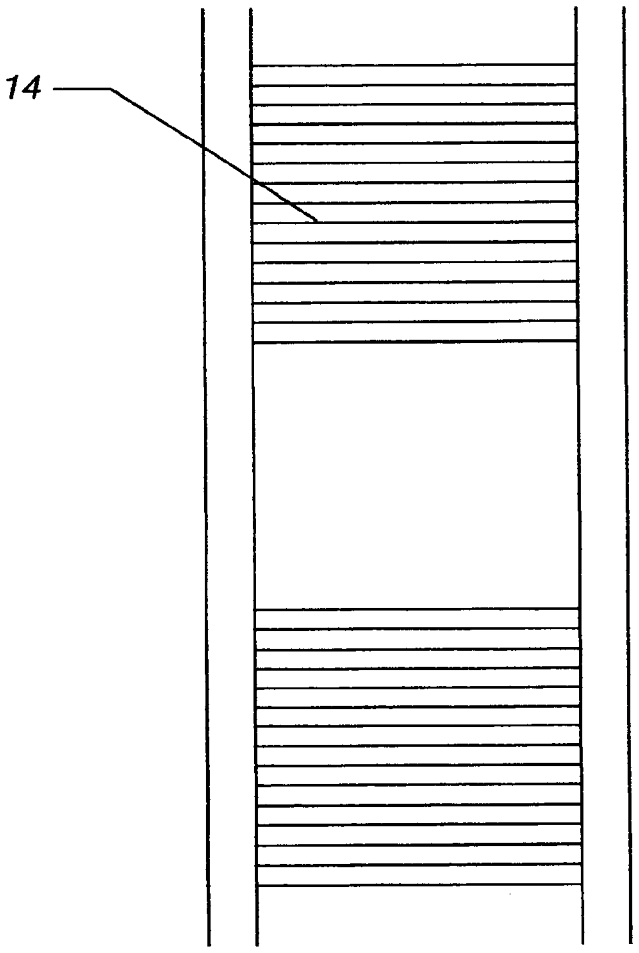
Fig.11

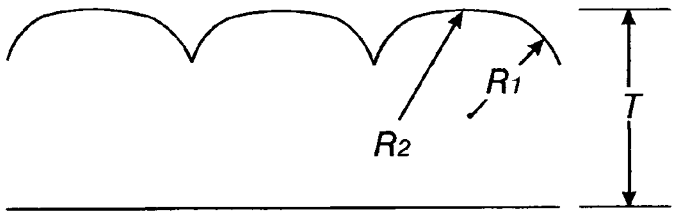
Fig.15
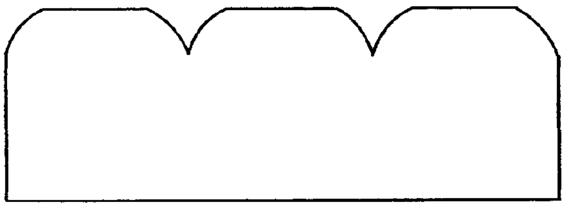
Fig.16
Fig.17
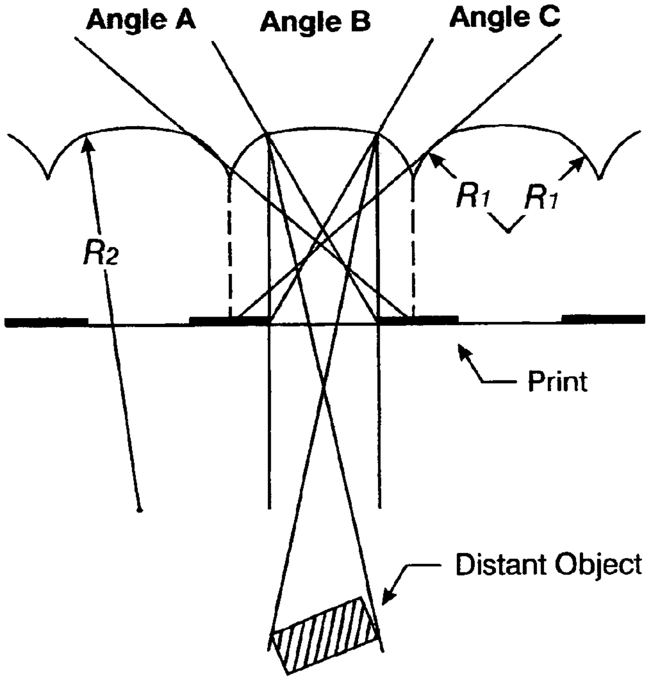

*Fig.18*
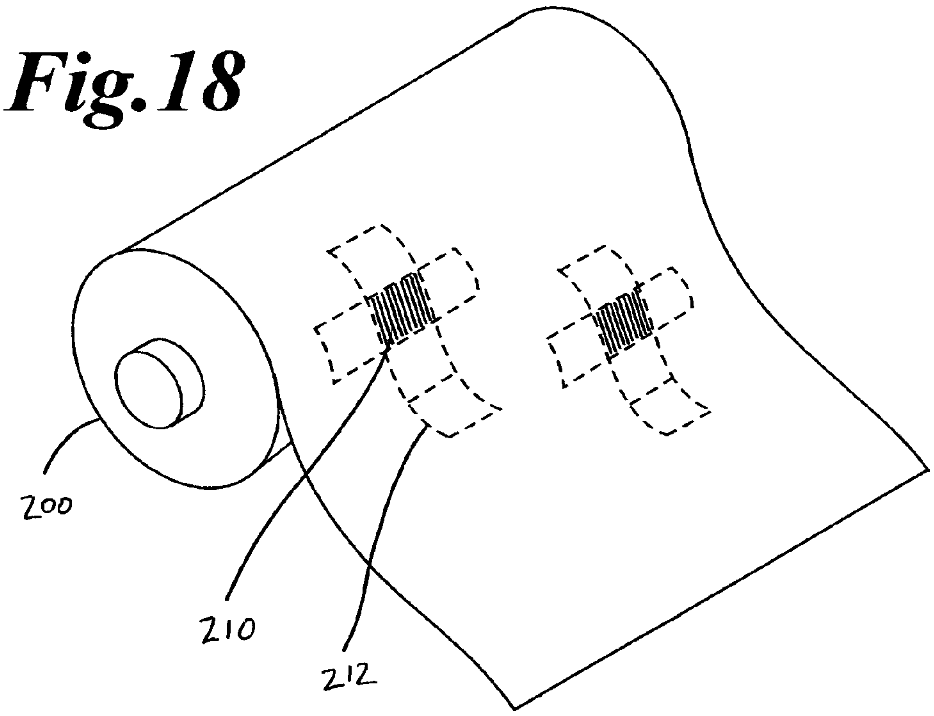
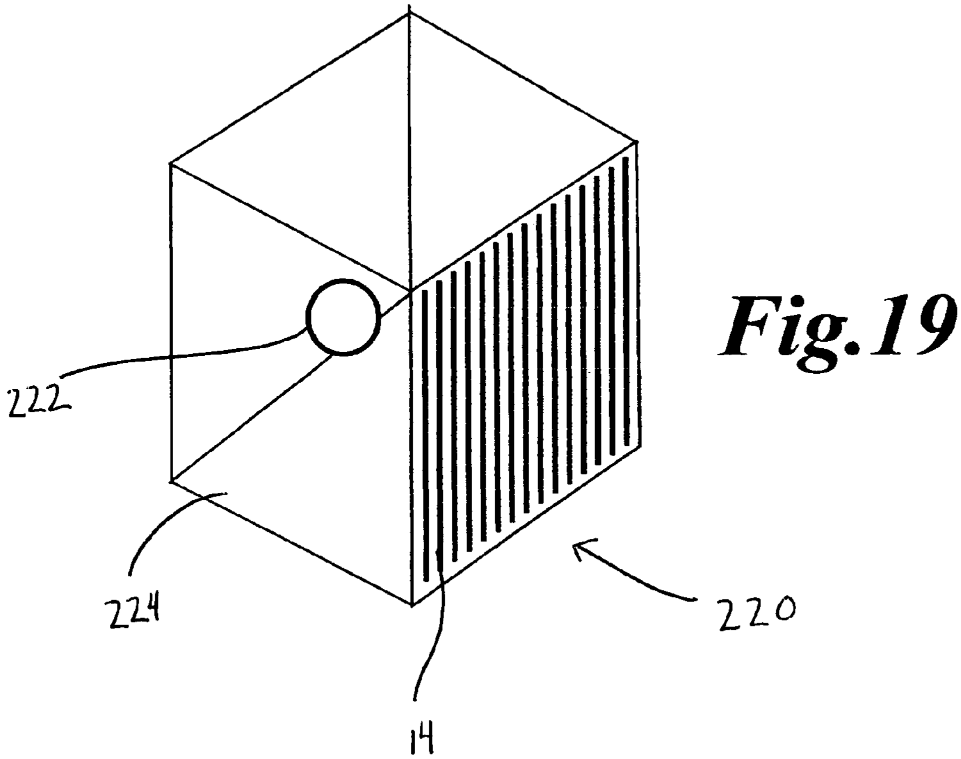
*Fig.19*

METHOD OF PRODUCING A PACKAGE FROM A SHEET HAVING LENTICULAR LENS IN PRE-SELECTED AREAS

CROSS REFERENCE TO RELATED APPLICATION

This application claims the benefit of U.S. Provisional Patent Application Ser. No. 60/449,272, filed on Feb. 21, 2003, and is hereby incorporated by reference.

BACKGROUND OF THE INVENTION

1. Field of the Invention

The present invention generally relates to a manufacturing method for packages and other items utilizing lenticular sheet products, and more particularly, the present invention relates to a method for producing a package comprising a flexible, optical lenticular sheet having high clarity lens arrays located thereon in pre-selected areas operable for use with consumer products.

2. Description of the Related Art

In the commercial industry, it is often desirable to impart visual effects such as three dimensionality or motion characteristics upon packages or labels of consumable products and the like. Due to expense and ease of design, regular print advertising was the pre-eminent and preferred form used on consumables. Regular print advertising is accomplished by printing, two-dimensional, non-movable information using words and pictures or graphics on packaging, labels, magazines, newspapers, brochures, fliers, posters, billboards, and signs. While some conventional print advertisements and packaging are interesting, most are not. The primary purpose of good advertisement in packaging is to attract the attention of the reader or customer and convey the desired information. Unfortunately, many printed signs, advertisements and packages do not attract the attention of the desired audience or customers. As such, the use of products or packages having lenticular effects has become increasingly popular.

A package having reverse printed lenticular sheet has the ability to attract ones attention by presenting an image that has depth, morphing characteristics, and/or can appear to have movement or the capability to flip from one image to another. A package or label having a printed lenticular sheet image on a store shelf has the ability to draw ones attention for a longer period of time than comparable non-lenticular packages. A lenticular sheet having a clear surface offers additional protection to the print on the reverse side from environmental hazards.

A disadvantage of and areas of concern for packages using lenticular sheets is the inability to clearly read small type, bar codes and such through a lenticular lens. By way of example, a package or container containing a medication must have clear and easy to read directions, warnings and/or disclaimers. By way of another example, a credit or debit card and identification cards like drivers license have small print which must be clearly visible but which could also benefit from having a portion of the card with a lenticular image.

Known lenticular lenses, or micro lenses, as used in imaging are typically elongated, lineal or dot patterned across an entire transparent sheet or web such that an image may be seen therethrough with the desired visual effect. The lenses can be either convex or concave in configuration. In addition, some lenses can be elliptical in shape. Typically, the lenses have a pre-determined radius of curvature and a pre-determined uniform pitch or repeat pattern. Lenticular lenses are thin, transparent lenses that are flat on one side and include a plurality of parallel, linear, side-by-side lenticules—elongate, convex or concave lenses—on a second side. Typically, an image is printed on the flat side to create a visual effect of zoom-in, zoom-out, steroscoping, three-dimensional sequencing, or movement of the image when viewed through the lenticules on the opposing side. The combination of the lenses and an image is referred to as a "lenticular assembly."

Prior art lenticular assemblies used on packages are manufactured in a continuous web with the lenticules being parallel to the longitudinal or latitudinal axis of the entire web. Manufacture of lenses may be performed in a variety of ways. In one example, lens shapes are engraved on precision engraving and diamond turning machines into special metal cylinders and polished to a high luster. The lenses are then index/step and repeat engraved to extremely high accuracies measured in the millionths of an inch onto a flexible, transparent sheet using an extrusion process or other known conventional means.

The images used for lenticular assemblies are produced, be they for morph, zoom, flip or 3-dimensional effects, by combining or interlacing a selected image on a computer such that the image is produced in a manner ready for printing. The interlacing of the image is performed by any conventional software application readily available in the market. Alternatively, commonly available software applications such as Photoshop™, Corel Draw™ and others may be utilized. Once interlaced, the image is reverse printed on the rear or back, planar side of the lenticular sheet, or sometimes printed on paper or film and attached to the back of the lenticular sheet. Reverse printing may be performed in any conventional manner by any convention printing means.

Subsequent to the reverse printing of the interlaced image upon the lenticular sheet, the lenticular assembly is complete and thereafter formed into a desired package or label configuration, such as, for example, a box shaped package. The resulting package utilizing the lenticular assembly or web of lenticular sheet suffers a number of shortcomings. Most significantly, the continuous orientation of the lenticules extending across the entirety of the web governs the orientation of the desired visual effect and, in some cases, the package design. Specifically, as a result of the lenticules' continuous orientation, fine print, bar codes or other information not intended to have the desired visual effect are distorted by the effects of the lenticules.

A further problem with the prior art packages using lenticular assemblies is that the lenticules exhibit a high amount of haze when viewing through the sheet due to light rays crossing when out of focus. The haze is caused by surface defects which scatter light, due to the space between the lenses being worn or of improper design causing additional light scattering and due to seeing into adjacent lenticules at low viewer angles. When the lenticular sheet is produced by sheet extrusion processes, additional haze is introduced by distortion, shrinkage and memory effect of the plastic resin during the forming and cooling of the sheet. Prior art teaches that a compound lenticular sheet with concave lenses on one side and convex lenses on the other side give clear distant viewing. However, these lenticular sheets cannot be printed with conventional lenticular images due to the lens arrangement appearing on the side to contain the print.

Accordingly, there is therefore a need for an improved method of producing a package utilizing a lenticular sheet that has lenticular lens arrays in at least one pre-selected portion of the sheet and a clear non-lenticular portion to accommodate fine detailed print or for other images in which the lens effect is undesired and would be a determent.

BRIEF SUMMARY OF THE INVENTION

To achieve the foregoing and other objects, and in accordance with the purposes of the invention as embodied and broadly described herein, the present invention provides various embodiments of a method for producing a package from a lenticular sheet having high clarity lenses located in pre-selected areas with the remainder of the sheet having a flat transparent property. In various embodiments, the method produces packages of various configurations from lenticular sheets having high clarity lenses in pre-selected areas which are operable for use with commercial products such as for example, signage, labels, and/or the like.

To facilitate higher clarity in viewing desired visual effects, the method of the present invention also provides a high clarity lens which has a first predetermined radius on either side of its distal end with the tip of the lens having a second, larger, predetermined radius. The lens is repeated in pattern forming a plurality of lenticular arrays which are formed on a transparent sheet in pre-selected areas using the method of the present invention. The first predetermined radius on either side of the lens has a focal point which dictates the thickness of the overall lenticular sheet. A portion of an image affixed under the center of the second, larger, predetermined radius can be seen without distortion from the side of the lenses as it is out of the focal range of the side portion of the lens. The high clarity lens produced by the method of the present invention provides functions for 3-dimensional visual effects, animation, morph animation characteristics and flip images. The lens produced by the present invention provides an improved sharpness, color intensity and accurateness of the printed image.

The method of the present invention also provides a high clarity lens wherein the center part or lane under each lens of a pre-selected area may be dropped or eliminated thereby providing a "see through" effect to a second distant object or to another print/image beyond or behind the first print on the backside of the lenticular sheet. The remainder of the area under the lenticular array can contain the full image with no "see through" effect. A flat window pane at the angle of intended distant viewing does not prevent the viewer's attention from being drawn to the print under and at the focal point of the lens segments. This distraction is prevented by putting a lens with a relatively long focal point at the angle where distant viewing would be expected while having adjacent lens segments with a short focal point for viewing at other angles.

According to one exemplary embodiment, the package produced from the lenticular sheet having lenses thereon in pre-selected areas is produced by the steps of first manufacturing a cutting tool such as a diamond stylus or other similar tool made from a carbide or other hard material. This step is performed by first shaping the material. The cutting tool is then used to engrave a pre-selected lens pattern, or array, into a metal cylinder or plate at the desired lens repeat in the desired areas. The engraving of the cylinder or plate is performed in any known conventional manner of engraving. However, it is preferable that a computer be utilized for directing the manner and depth of the cutting tool as it engraves the cylinder or plate. The lens pattern as engraved into the cylinder is then polished to achieve an optimal optical surface. Thereafter, the lens pattern is transferred to a desired side of a flexible, transparent plastic sheet at a pre-selected area by using an extrusion nip when the sheet is formed or at an embossing nip with a preformed and heated plastic sheet, or by casting if made from an ultra violet light curing resin or with other curable resins. Subsequent to the embossing of the sheet material, an image or other object is printed on the smooth backside of the lenticular sheet, thereby forming an improved lenticular sheet assembly wherein a high clarity lens is used and placed in a pre-selected area to exhibit a desired visual effect. Thereafter, the sheet product is placed into a die cutting or other similar machine such that a pre-selected package or label design can be cut from the sheet. Upon having the desired shape cut from the machine, the resulting product is formed into the package.

According to another exemplary embodiment, a lenticular array is engraved into and across the entirety of a plate or cylinder. The plate or cylinder is then provided with a pre-mask that is placed in certain areas where it is desirable to keep and protect the lenses. The pre-mask is made of a dielectric material whose function is to prevent plating from taking place in this area. The plate or cylinder is then electroplated with a metal such as copper. The electroplated metal is applied such that it builds up to a level higher that the lenticules under the pre-mask area. Thereafter, the pre-mask is removed and the electroplated metal is cut back to a desired level. Thereafter, the lens pattern is transferred to a desired side of a flexible, transparent plastic sheet at a pre-selected area by using an extrusion nip when the sheet is formed or at an embossing nip with a preformed and heated plastic sheet, or by casting if made from an ultra violet light curing resin or with other curable resins. Subsequent to the embossing of the sheet material, an image or other object is printed on the smooth backside of the lenticular sheet, thereby forming an improved lenticular sheet assembly wherein a high clarity lens is used and placed in a pre-selected area to exhibit a desired visual effect. Thereafter, the sheet product is placed into a die cutting or other similar machine such that a pre-selected package or label design can be cut from the sheet. Upon having the desired shape cut from the machine, the resulting product is formed into the package.

According to another exemplary embodiment, a lenticular array is engraved into and across the entirety of a plate or cylinder. Subsequent to the engraving of the plate or cylinder, the plate or cylinder is placed in a gravure engraving machine operable for removing portions of the cylinder under computer direction and controls. Desired portions or lenticules are removed. Thereafter, the lens pattern is transferred to a desired side of a flexible, transparent plastic sheet at a pre-selected area by using an extrusion nip when the sheet is formed or at an embossing nip with a preformed and heated plastic sheet, or by casting if made from an ultra violet light curing resin or with other curable resins. Subsequent to the embossing of the sheet material, an image or other object is printed on the smooth backside of the lenticular sheet, thereby forming an improved lenticular sheet assembly wherein a high clarity lens is used and placed in a pre-selected area to exhibit a desired visual effect. Thereafter, the sheet product is placed into a die cutting or other similar machine such that a pre-selected package or label design can be cut from the sheet. Upon having the desired shape cut from the machine, the resulting product is formed into the package.

According to another exemplary embodiment, a method of producing a package from a lenticular sheet comprises the steps of producing a transparent sheet by engraving a desired lens pattern into a flat metal plate or into and over an entire cylinder wherein the surface metal of the plate or cylinder in which the pattern is engraved into is loosely bonded to the base thereof and can be removed to become an engraved metal shell. Thereafter, the engraved metal shell is cut to the desired shape and turned in the desired direction of which the lenses are to run on the final transparent patterned sheet. The metal shell is then fastened to the cylinder or plate to be used to produce the transparent patterned sheet. Thereafter, the lens pattern is transferred to a desired side of a flexible, transparent plastic sheet at a pre-selected area by using an extrusion nip when the sheet is formed or at an embossing nip with a preformed and heated plastic sheet, or by casting if made from an ultra violet light curing resin or with other curable resins. Subsequent to the embossing of the sheet material, an image or other object is printed on the smooth backside of the lenticular sheet, thereby forming an improved lenticular sheet assembly wherein a high clarity lens is used and placed in a pre-selected area to exhibit a desired visual effect. Thereafter, the sheet product is placed into a die cutting or other similar machine such that a pre-selected package or label design can be cut from the sheet. Upon having the desired shape cut from the machine, the resulting product is formed into the package.

As a result of the method of the present invention in the disclosed embodiments, the center part of the lens is capable of being left blank on the flat side when printing: for example, if printing a three image flip, the center image can be left out or not printed leaving a clear portion of the lens so that the printed sheet can be placed over or adhered to a previously printed image for see through to the previous printed image. This is particularly advantageous for example, when using the lenticular sheet in a package design, with verbiage, text or other images appearing at an angle by the viewer and the product within the package from a straight on position. The lenticular sheet produced by the present invention could also have verbiage of some type appearing at an angle taped to an image. This can also be part of the package where the contents are seen clearly inside at a center position.

BRIEF DESCRIPTION OF THE DRAWINGS

These and other features, aspects and advantages of the present invention are better understood when the following detailed description of the invention is read with reference to the accompanying drawings, in which:

FIG. 2 is a cross-sectional view of the lenticular array shown in FIG. 1.

FIG. 3 is a cross-sectional view of a lens element of the lenticular array shown in FIG. 1.

FIG. 6 is a cross-sectional view of an engraved cylinder or plate with a lenticular pattern.

FIG. 7 is a cross-sectional view of an engraved lenticular pattern with a mask placed over the lenticules desired to be kept.

FIG. 10 is a surface view of the finished plate showing lenticules in the desired areas.

FIG. 11 is a surface view of a continuous web with lenses in selected areas and engraved across the cylinder.

FIG. 15 shows a smaller radius of curvature on either side of the lens, which provides a thinner sheet FIG. 16 shows a higher pitch lens element with the same radius of curvature on each side by extending the length of the center lens.

FIG. 17 shows a FIG. 14 with the center lane left unprinted in certain areas for see through to an object or print at or beyond the backside of the lenticular sheet.

FIG. 18 shows a perspective view of a produced lenticular sheet roll having lens arrays in pre-selected areas and a die cut package design.

FIG. 19 shows a perspective view of a finished package constructed in accordance with the method of the present invention.

DETAILED DESCRIPTION OF THE INVENTION

The present invention will now be described more fully hereinafter with reference to the accompanying drawings in which exemplary embodiments of the invention are shown. However, this invention may be embodied in many different forms and should not be construed as limited to the embodiments set forth herein. These exemplary embodiments are provided so that this disclosure will be both thorough and complete, and will fully convey the scope of the invention to those skilled in the art. Like reference numbers refer to like elements throughout the various drawings.

The present invention provides various embodiments of a method for producing a package from an optical lenticular sheet having high clarity lens arrays located in pre-selected areas. The various embodiments of the present invention may be applied in any known lenticular manufacturing system. As will be understood by those in the art, the term "package" includes any label, signage, or other device intended to encase or advertise a product. As is well known and understood in the art, lenticular lens material utilizes rows of simple and commonly dome-shaped lenses or "lenticules" in combination with a lineform or interlaced image, to create the desired visual effect. As used herein, the term "lenticular sheet" is intended to include any optical sheet, roll, film or material that is suitable for use in the printing arts and has a substantially transparent quality. Material compositions of such sheets may include, for example and without limitation, polypropylene, polyester, polyethylene, polyvinylchloride, and polystyrene. All such compositions are considered to be polymeric sheet materials and are synonymous thererwith. In one example, the lenticular sheet generally comprises a flat side and a lenticulated side including the lenticules. An image is affixed, or reverse printed, to the flat side of the sheet thereby allowing a viewer to see the desired visual effect from lenticulated side. The resulting product is an improved lenticular assembly that provides the advantages of the prior art without the short comings.

Figure 1:
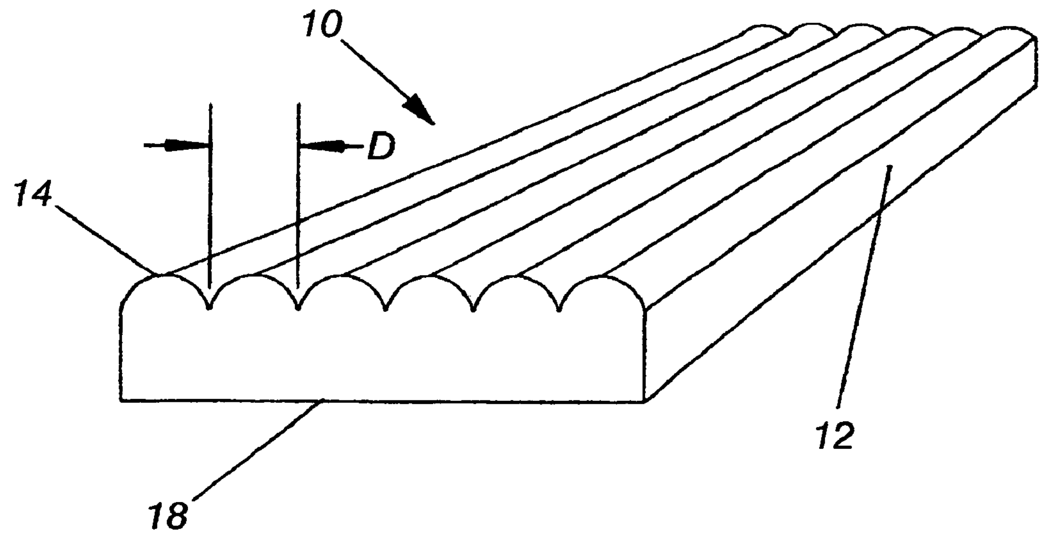
Fig.1 (PRIOR ART)
FIG. 1 is a perspective view of a portion of a known lenticular array.

Referring now to the drawings, FIG. 1 is a perspective view of a portion of a known lenticular array 10. The array 10 has lens elements 14 that are cylindrical lenses with a circular cross section. The width of each lens is D. The lenticular array consists of a dielectric medium 12 with multiple convex lenses 14 formed on a viewer side. The dielectric medium 12 may be any transparent material, but is typically a clear plastic having good mechanical properties. The planar side of the array 18 contains a printed image that is commonly designed using a computer to be addressed by the array 10 and variation in a viewer's angle of regard.

FIG. 2 is a cross-sectional view of the lenticular array 10 shown in FIG. 1. The array 10 comprises a sheet of material with dimensions MD×ND×~nR/(n−1) where D is the width of a lens element 14 as best shown in FIG. 2, n is the index of refraction of the plastic material, R is the radius of the lens element 14 and R<D/2. M and N are product variables. In one example, a button may be presented that flips from a picture to a slogan, wherein M and N may be on the order of 50 to 100 or more. The actual dimension D depends on the design viewing distance and quality objectives.

The transparent material is commonly formed as a sheet with a lens array formed on the entirety of a front side 16, or a viewer side. The backside 18, or flat side, is considered a non-viewer side. The backside 18, or flat side, is considered a non-viewer side. The radius of the substantially circular cross section, R, is shown larger than the lens spacing D. The overall thickness of the array is:

Thickness~R×n/(n−1)

Where n is an index of refraction for the dielectric medium. The backside 18 is printed with an appropriate computer generated image that is aligned with the lens array 10, thereby enabling the viewer to see a repertoire of two or more, typically eight, images depending on the viewer's angle of regard.

FIG. 3 is a cross-sectional view of the lens element 14 of the lenticular array 10 shown in FIG. 1. Since the viewer's eye is on the order of 4,000 times the radius of the lens cross section, an individual lens can be analyzed with negligible error by assuming that light rays at a first angle 20 and light rays at a second angle 22 are parallel. The lens 14 focuses the rays from a repertoire of angles onto a repertoire of printed regions. The light rays from the first angle 20 focus on a printed region 24. From symmetry, light rays at an angle that is negative with respect to a perpendicular to the array 10, if the angle 20 is defined as positive, focus on an area 28 that is mirrored from the centerline of the lens 14. Light rays from the second angle 22 focuses on and therefore select a second, independent area 26. If the repertoire of images has a defined number, the lens 14 must be capable of adequately focusing on a same number of independent areas. The actual repertoire of angles need not be a linear progression. If one marks off the projection of the lens 14 on the surface 18 in q centers where q is the number of images in the repertoire and then calculates the corresponding angles of regard, parallel rays at these angles must focus in a reasonably non-overlapping fashion on the surface at the best image plane compromise available. Non-compensated lenses will typically depart from the ideal. A measure of the quality of a lens is the standard deviation of a point from a spread of points that intersect the lens. If the standard deviation is such that focus areas overrun adjacent focus areas, the images seen will not be well defined in color and especially definition.

Figure 4:
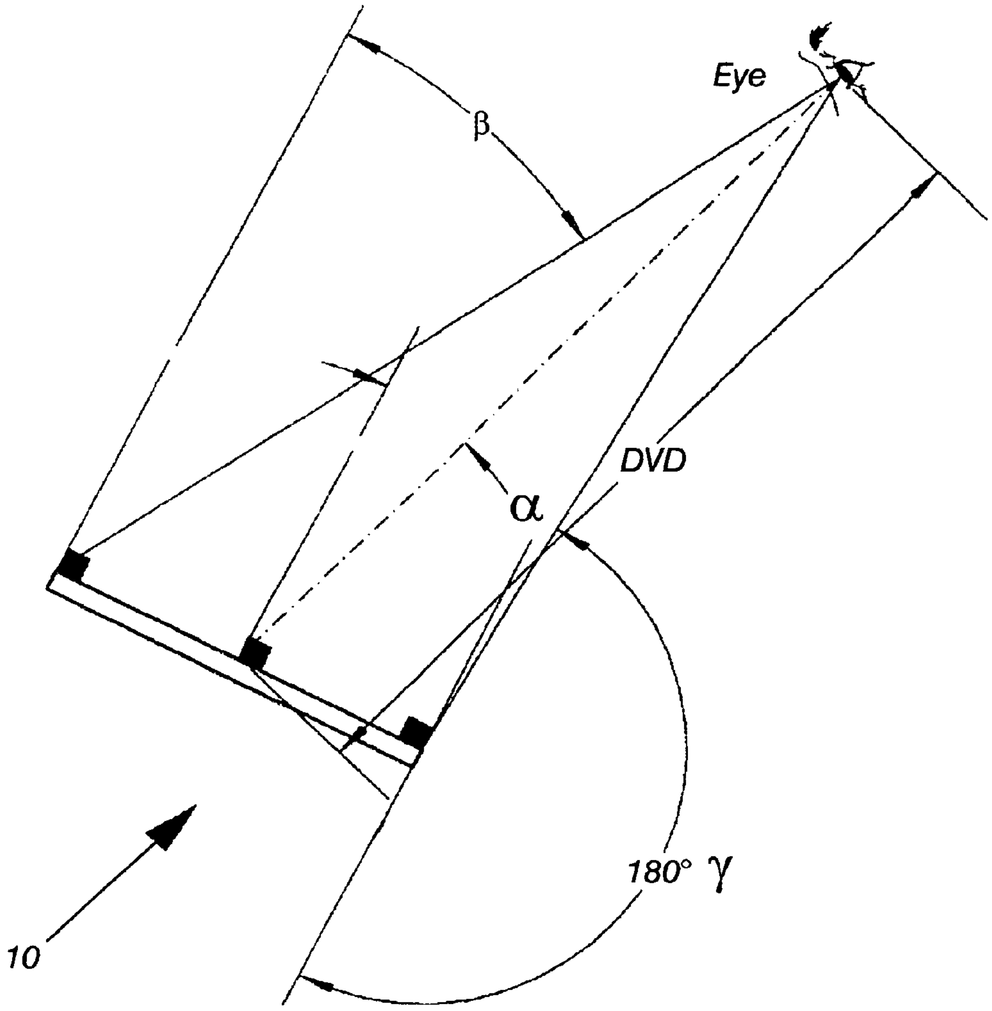
Fig.4 (PRIOR ART)
FIG. 4 is a side view of the lenticular array shown in FIG. 3 showing the geometry of the array.

FIG. 4 is a side view of the lenticular array 10 shown in FIG. 1 showing the geometry of the array. The distance from the eye of the viewer to the center of the array 10, DVD, is the design viewing distance. The lens spacing in the array 10 should be small with respect to DVD. Improvement in quality is noticeable up to a DVD/D ratio of 3400 that corresponds to 1 arc minute at the eye. Typical DVD/D ratios exceed 1000. For example, a common design point is DVD=18 inches and D=0.01-inches to provide a ratio of 1800. As previously mentioned, from the aspect of a single lens, the angle of regard with respect to a perpendicular to the lens 14 may be regarded a constant. From the aspect of the entire array 10, this angle varies continuously and critically from an angle $\gamma$ on a bottom of the array 10 to an angle $\alpha$ at a center of the array 10 to an angle $\beta$ on a top of the array 10. The computer-designed printed array uses these angular variations to design the underlying picture segments associated with each central angle of regard, $\alpha$. There may be eight principal angles of regard $\alpha$, corresponding to eight images. At each angle of regard, the gradual variation from $\gamma$ at the bottom of $\beta$ at the top are correlated with the desired image at that angle.

Figure 5:
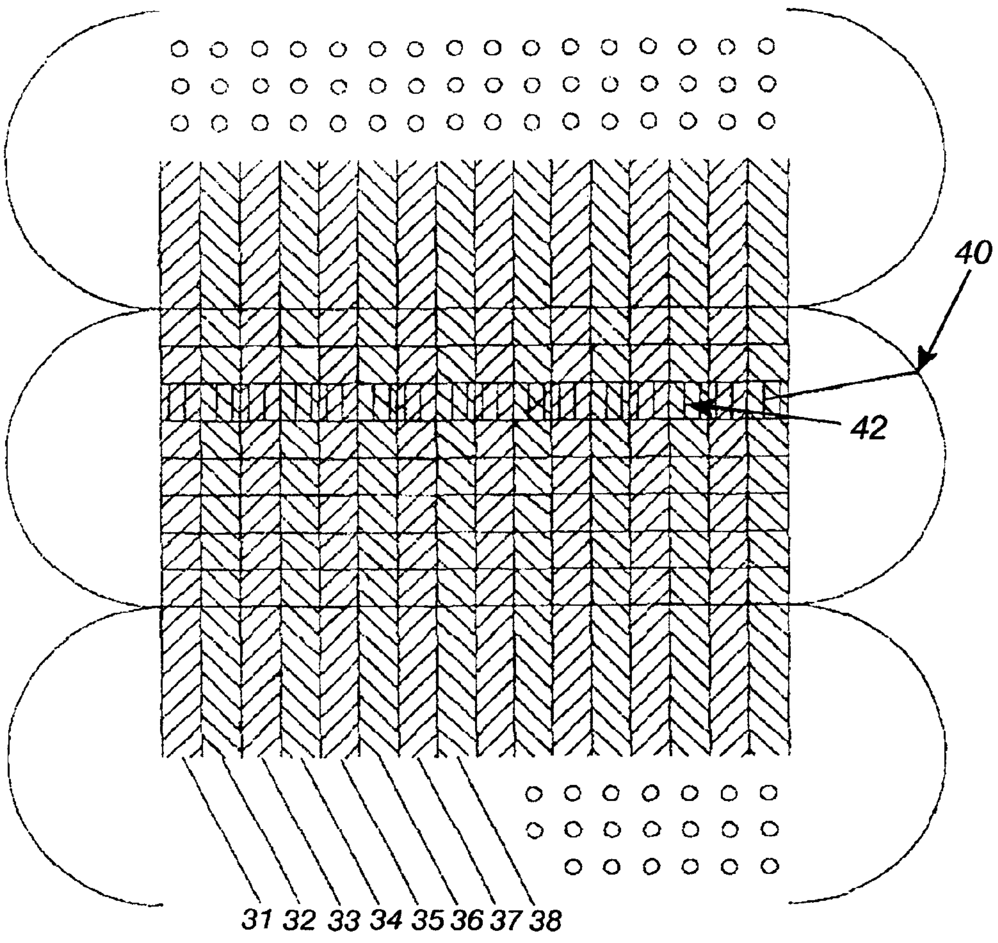
FIG. 5 is a detailed view of a known lenticular array showing image addressing.

FIG. 5 is a detailed view of a known lenticular array showing image addressing. As the angle of regard for a specific image varies from P (FIG. 4) at the top of the screen to $\gamma$ (FIG. 4 at the bottom, the image which is printed in stripes 31,32,33,34,35,36,37, and 38 that run perpendicular to the axes of the cylindrical micro lenses vary in content. For a particular micro lens, the angle of regard intersects the surface of the lens at a point 40 and is focused on a stripe 42 of about 12.5% of the width of the lens that intersects the printed stripes. The strip 42 is aligned to the array at printing. The orthogonal stripes blend and diffuse errors throughout the image as well as account for gradual shift in angles of regard from top to bottom at each selection angle.

The package formed from the lenticular assembly of the present invention is operable for presenting a desired visual effect that serves as a significant improvement over the above described prior art. The present invention provides a method of producing a package from a high clarity lenticular sheet wherein higher clarity is needed and/or the visual effect is only desired in pre-selected areas of the lenticular sheet. In this regard, the lenticular sheet produced by the present invention can, for example and without limitation, presents a sequence of two or more images in pre-selected areas of the sheet, which appear and/or disappear as a viewer changes his angle of regard over a range of less than 90 degrees, typically from 15 to 50 degrees. The viewer's angle of regard is preferably the angle between a normal to a plane and a viewer's eye. The remainder of the lenticular sheet or the portion of the sheet without the lenticular pattern or arrays permits the viewer to see images through the sheet without any distortion caused by the lens arrays. The method of the present invention also produces a sheet having lenses consisting of plano-convex cylindrical lens elements with a pre-determined periodicity that depends from a viewing distance for which the lens is designed. By way of example and without limitation, at normal viewing distances for reading of 18 inches, the periodicity of the cylindrical elements is preferably 100 elements to the inch or more. Lenticular sheet designs of up to 250 elements per inch can be achieved using this method. Indeed, each lens element brings into view a slice or portion of an underlying printed image into focus. The underlying printed image is generated by a computer program.

Without the high clarity array of lenses formed by the method of the present invention, the printed image affixed to the flat side of the lenticular sheet appears to be a set of stripes that run orthogonally to the axes of the lenses with a multi-image stripe periodicity equal to the lens periodicity but divided into image-specific stripes by the number of images in the set. For example and without limitation, if the set has eight images and the lenses are at 100 per inch, a periodicity of eight stripes in 0.01 inches are used, one stripe for each image. The viewer sees the intersection of a focused stripe due to the lens and the printed stripe. Technically, two configurations exist, one in which the cylindrical axes are vertical, and one in which the axes are horizontal. In the vertical case, the images are selected to appear at differing depths since the right and left eyes of the viewer have differing angles of regard. The device can be stationary, and, typically, eight images that appear to be at differing depths are superimposed. In the horizontal case, the viewer's angle of regard must be changed. As the device is rotated through a series of angles of regard, a sequence of images is seen. Various effects are possible depending on the design of the stripes. One image can gradually transform into another, termed "morphing". A sequence of images of various stages of an action scene can give a motion-like effect, termed 'motion'. If the images are unrelated, the viewer will see the unrelated sequence appear, termed 'flip'. One image can be a magnification of the preceding image and the effect is similar to looking through a zoom lens, termed 'zoom'.

In accordance with one exemplary embodiment of the present invention, the lens arrays used in the sheet which form the package are fabricated by first designing a cutting tool, such as a stylus, with a desired lens shape. The cutting tool is preferably made of a diamond or carbide, however, it will be understood by those skilled in the art that any hard material suitable for engraving cylinders may be used. The shape of the cutting tool is dictated by the desired visual effect, however, in order to provide a higher clarity, a first radius is formed on either side of the distal end of the cutting tool and then a second, larger, radius is formed on the tip of the cutting tool.

Once the cutting tool is designed, the inverse lens shape is engraved into pre-selected portions of a flat plate or cylinder using any known, conventional method of engraving, thereby forming a plurality of inverse lens arrays or patterns. Preferably, the engraving processing includes the use of a computer operable for directing the cutting tool in both direction and depth such that an optimal lens pattern can be transferred into the plate or cylinder. Advantageously, by using the engraving process for the plate or cylinder, a variety of inverse lens patterns can be engraved into the plate or cylinder, thereby providing a variety of lens patterns embossed on the same sheet, including but without limitation, lens patterns having different shapes and lens patterns extending in different directions such as longitudinally and latitudinally from a certain axis.

Subsequent to engraving the plate or cylinder, the cylinder is placed into the lenticular system or process of manufacture. The inverse lens pattern is then transferred to a sheet material using known conventional extrusion embossment methods, thereby forming the lens pattern on the sheet in the desired areas only. Preferably, the sheet material is plastic. Further, it will be appreciated by those skilled in the art, that a variety of plastics can be employed, for example and without limitation, acrylics, polystyrenes, polycarbonates, polyesters, polyolefin's, polyvinyl chlorides and all such polymeric equivalent materials.

Subsequent to the formation of the lenticular sheet, a striped image array is produced by a thermal or piezoelectric ink jet printer that is readily capable of producing 1200 picture elements per inch and laminated or otherwise affixed to the flat side of the lenticular sheet such that the image location and direction corresponds to the lens array location and direction. When the thickness of the lens array sheet is small enough, the pattern can be reverse printed using a conventional printing press. Reverse printing using a transfer printing press is an option for array resolutions of greater than 60 elements per inch. Another option for directly printing a reverse image on the sheet is screen-printing which is an option for array resolutions of greater than 10 elements per inch up to about 60 elements per inch. The printing medium may be plastic or paper. Preferably, the printed array has the same frequency as the lens array, such that a print that contains multiple image information can be linearly registered to the lens. The device operation of the visual effect is designed into the image dissection and the lens array.

After the image is affixed to the lenticular sheet, the sheet is placed into a conventional packaging or stamping process such as a die cut process such that a pre-determined pattern of a package design can be cut from the sheet. It will be understood by those skilled in the art that the pre-determined pattern corresponds to the location of the image and the un-embossed portions of the sheet. Further, it will be understood by those skilled in the art, that the lenticular sheet can be placed in a stamping machine to cut or stamp out the desired package design from the sheet. Once the desired package design is cut from the lenticular sheet, the pattern is folded or otherwise formed in the package. The resulting product allows a viewer to see the desired visual effect in the pre-selected areas and the product or other information in the areas without the lens arrays.

Figure 8:
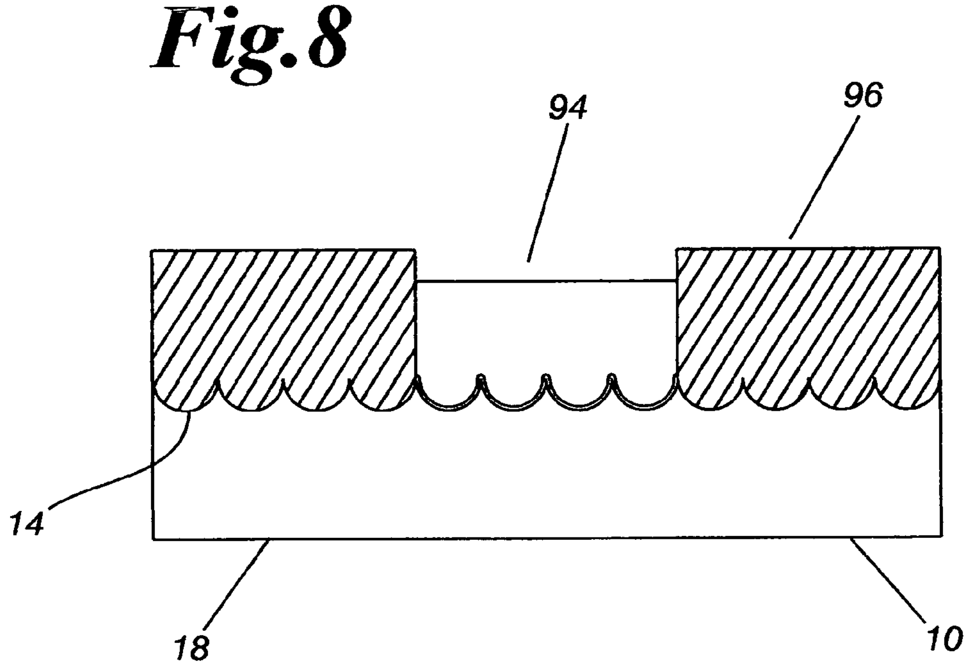
FIG. 8 is a cross-sectional view of an engraved lenticular pattern with a mask and with electroplating in the areas not desired to be kept.
Figure 9:
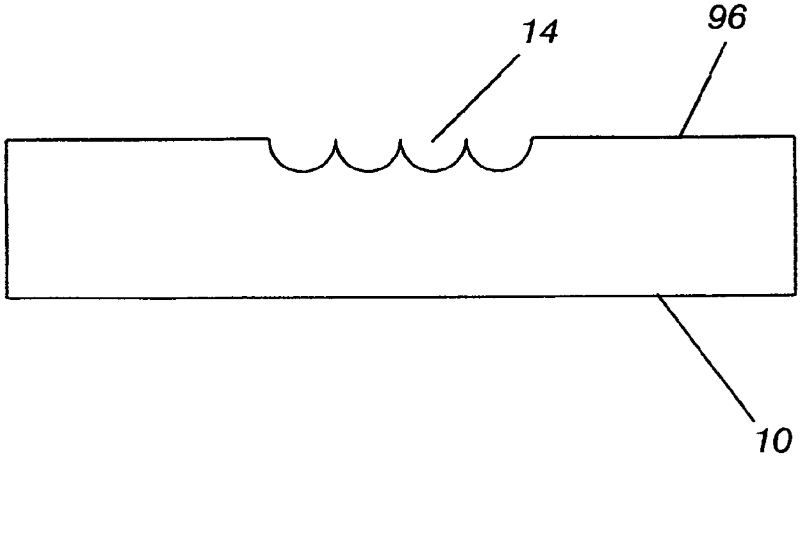
FIG. 9 is a cross-sectional view of an engraved lenticular pattern with the mask removed and the electroplating cut back to the desired level and polished, leaving lenticules in desired areas.

Referring now to FIG. 6, a lens constructed in accordance with an alternative method of the present invention is disclosed. As seen, FIG. 6 is a cross sectional view of a portion of a lenticular array 10 as would be engraved into and across a plate or cylinder. This plate or cylinder could be used to produce the lens pattern of FIG. 1 (Prior Art). FIG. 7 depicts a cross sectional view of a portion of the lenticular array 10 with a pre-mask 94 placed in certain areas on the engraved plate or cylinder where it is desirable to keep and protect the lenses 14 from being electroplated by a metal such as copper. This pre-mask 94 is pre-shaped to a desired shape, for example, a heart or triangular shape and attached to the desired area. The pre-mask 94 is made of a dielectric material whose function is to prevent plating from taking place in this area. FIG. 8 is a cross sectional view of a portion of the lenticular array 10 with a pre-mask 94 placed in certain areas on the engraved plate or cylinder where it is desirable to keep and protect the lenses 14 from the electroplated metal 96. The electroplated metal 96 is provided and builds up to a level higher that the lenticules 14 under the pre-mask area 94. FIG. 9 is a cross sectional view of a portion of the lenticular array 10 with the pre-mask 94 removed from the lenses 14 and showing the electroplated metal 96 cut back to a desired level 98. Thereafter, the lens pattern is transferred to a desired side of a flexible, transparent plastic sheet at a pre-selected area by using an extrusion nip when the sheet is formed or at an embossing nip with a preformed and heated plastic sheet, or by casting if made from an ultra violet light curing resin or with other curable resins. Subsequent to the embossing of the sheet material, an image or other object is printed on the smooth backside of the lenticular sheet, thereby forming an improved lenticular sheet assembly wherein a high clarity lens is used and placed in a pre-selected area to exhibit a desired visual effect.

After the image is affixed to the lenticular sheet, the sheet is placed into a conventional packaging or stamping process such as a die cut process such that a pre-determined pattern of a package design can be cut from the sheet. It will be understood by those skilled in the art that the pre-determined pattern corresponds to the location of the image and the un-embossed portions of the sheet. Further, it will be understood by those skilled in the art, that the lenticular sheet can be placed in a stamping machine to cut or stamp out the desired package design from the sheet. Once the desired package design is cut from the lenticular sheet, the pattern is folded or otherwise formed in the package. The resulting product allows a viewer to see the desired visual effect in the pre-selected areas and the product or other information in the areas without the lens arrays.

According to another exemplary embodiment, a lenticular array is engraved into and across the entirety of a plate or cylinder. Subsequent to the engraving of the plate or cylinder, the plate or cylinder is placed in a gravure engraving machine operable for removing portions of the cylinder under computer direction and controls. Desired portions or lenticules are removed. Thereafter, the lens pattern is transferred to a desired side of a flexible, transparent plastic sheet at a pre-selected area by using an extrusion nip when the sheet is formed or at an embossing nip with a preformed and heated plastic sheet, or by casting if made from an ultra violet light curing resin or with other curable resins. Subsequent to the embossing of the sheet material, an image or other object is printed on the smooth backside of the lenticular sheet, thereby forming an improved lenticular sheet assembly wherein a high clarity lens is used and placed in a pre-selected area to exhibit a desired visual effect.

After the image is affixed to the lenticular sheet, the sheet is placed into a conventional packaging or stamping process such as a die cut process such that a pre-determined pattern of a package design can be cut from the sheet. It will be understood by those skilled in the art that the pre-determined pattern corresponds to the location of the image and the un-embossed portions of the sheet. Further, it will be understood by those skilled in the art, that the lenticular sheet can be placed in a stamping machine to cut or stamp out the desired package design from the sheet. Once the desired package design is cut from the lenticular sheet, the pattern is folded or otherwise formed in the package. The resulting product allows a viewer to see the desired visual effect in the pre-selected areas and the product or other information in the areas without the lens arrays.

FIG. 10 is a cross sectional view of a portion of the lenticular array 10 with the lenses 14 and the cut back portions 100. FIG. 11 is a cross sectional view of a portion of the lenticular array 10 produced in accordance with the present method wherein the lenses 14 are removed in certain areas 100 on the engraved plate or cylinder by a diamond stylus or cutting tool on a gravure engraving machine, while leaving the lenses 14 in the desired areas of the engraved plate. By using a gravure engraving machine, it is not necessary to pre-mask the areas desired to be left with a lenticular pattern. The diamond stylus used to remove the lenses in the unwanted areas is pre-determined and computer controlled. Therefore, the pattern can be generated by the computer as is done when engraving print patterns. The lens area 14 will be higher on the plate or cylinder as this is a subtractive process. On the plastic sheet, the lens area 14 will be below the surface of the flat gravure engraved portions of the sheet. The gravure engraving machine can also apply register marks or bands needed for printing and later operations.

After the image is affixed to the lenticular sheet, the sheet is placed into a conventional packaging or stamping process such as a die cut process such that a pre-determined pattern of a package design can be cut from the sheet. It will be understood by those skilled in the art that the pre-determined pattern corresponds to the location of the image and the un-embossed portions of the sheet. Further, it will be understood by those skilled in the art, that the lenticular sheet can be placed in a stamping machine to cut or stamp out the desired package design from the sheet. Once the desired package design is cut from the lenticular sheet, the pattern is folded or otherwise formed in the package. The resulting product allows a viewer to see the desired visual effect in the pre-selected areas and the product or other information in the areas without the lens arrays.

According to another exemplary embodiment, a method of manufacturing a lenticular sheet comprises the steps of producing a transparent sheet by engraving a desired lens pattern into a flat metal plate or into and over an entire cylinder wherein the surface metal of the plate or cylinder in which the pattern is engraved into is loosely bonded to the base thereof and can be removed to become an engraved metal shell. Thereafter, the engraved metal shell is cut to the desired shape and turned in the desired direction of which the lenses are to run on the final transparent patterned sheet. The metal shell is then fastened to the cylinder or plate to be used to produce the transparent patterned sheet. Thereafter, the lens pattern is transferred to a desired side of a flexible, transparent plastic sheet at a pre-selected area by using an extrusion nip when the sheet is formed or at an embossing nip with a preformed and heated plastic sheet, or by casting if made from an ultra violet light curing resin or with other curable resins. Subsequent to the embossing of the sheet material, an image or other object is printed on the smooth backside of the lenticular sheet, thereby forming an improved lenticular sheet assembly wherein a high clarity lens is used and placed in a pre-selected area to exhibit a desired visual effect.

After the image is affixed to the lenticular sheet, the sheet is placed into a conventional packaging or stamping process such as a die cut process such that a pre-determined pattern of a package design can be cut from the sheet. It will be understood by those skilled in the art that the pre-determined pattern corresponds to the location of the image and the un-embossed portions of the sheet. Further, it will be understood by those skilled in the art, that the lenticular sheet can be placed in a stamping machine to cut or stamp out the desired package design from the sheet. Once the desired package design is cut from the lenticular sheet, the pattern is folded or otherwise formed in the package. The resulting product allows a viewer to see the desired visual effect in the pre-selected areas and the product or other information in the areas without the lens arrays.

The foregoing describes the theory, which allows the lenticular portion of this sheet to produce the desired special effects. The smooth un-embossed clear portion of the lenticular sheet provides no visual effect by the production of this invention, as reverse printing this sheet is known and predictable.

Figure 12:
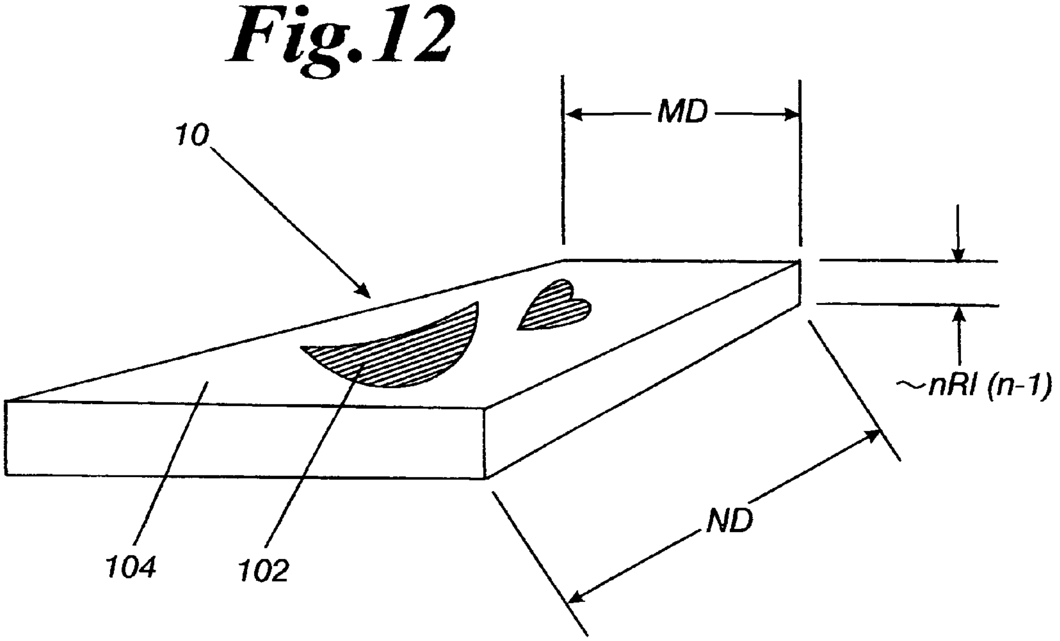
FIG. 12 is a sketch showing use of the product of this invention.

Referring back to the drawings, FIG. 12 is a surface view of a portion of the final engraved lenticular sheet the process of this invention, wherein lenses 14 are located in the desired portions of the sheet only. FIG. 12 is a surface view of a continuous web 104 showing pre-selected areas 102 that have a lenticular pattern. This lenticular pattern is engraved across the sheet to facilitate its use after reverse printing. Lenticular designs are most often vertical in order to accommodate the viewers eyes which are on a horizontal plane in order to achieve the before described effects allowed by lenticular lenses. However, it will be understood by those in the art that the present invention allows the lenticular design to be horizontal or diagonal in direction. The clear unembossed portion of the web is shown by 104. Fine, easy to read print, bar codes and other information, which is not desirable to be printed under the lens portion, is found at 104. Clear and flat stripes are an aid to extruding the web in reducing stretch of the web as it is extruded. The stripes also allow a firmer roll to be wound up off the extruder.

Figure 13:
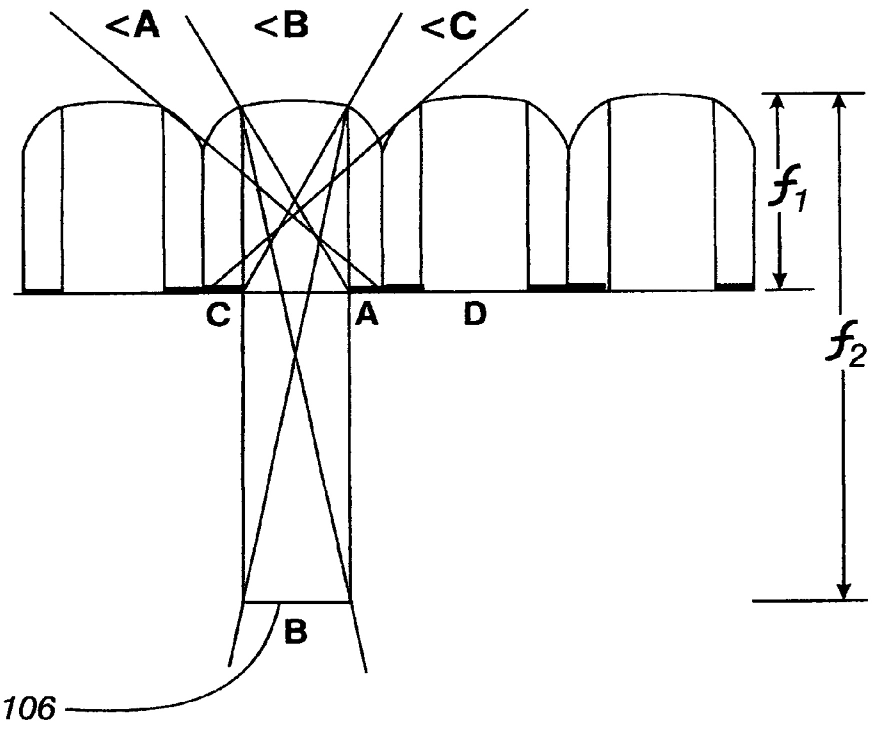
FIG. 13 shows one of the aspects of this invention where a lens as given in FIG. 1 with a certain radius is given a tip with a second larger radius.
Figure 14:
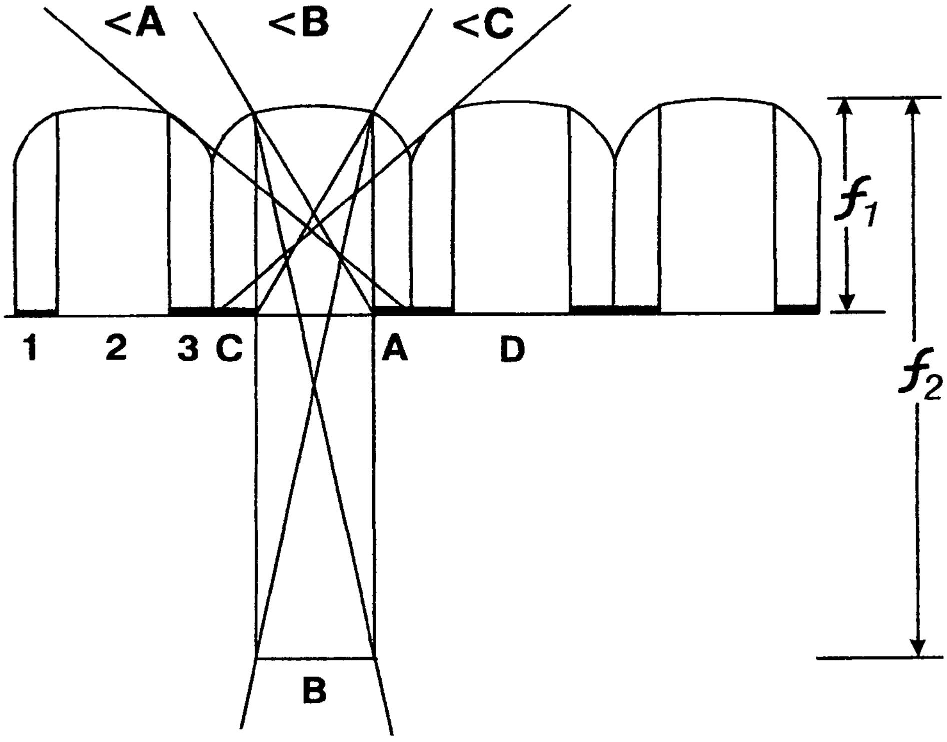
FIG. 14 shows FIG. 13 with a three flip image printed on the smooth side.

FIG. 13 shows the high clarity lens produced by the present method wherein the lens has a certain radius on either side of the distal end and a tip with a second, larger, radius. The use of the second larger radius gives a much improved clarity and see through effect. FIG. 14 shows FIG. 13 with a three flip image printed on the smooth side. FIG. 15 shows a smaller radius of curvature on either side, which gives a thinner sheet. Advantageously, the high clarity lens shape provides the ability to keep the same pitch for a variety of sheet thicknesses. This is not possible using current prior art lens designs. FIG. 16 shows a higher pitch with the same radius of curvature on each side by extending the length of the center lens. The pitch number can also be decreased by the same techniques. FIG. 17 shows the lens of a FIG. 14 with the center lane left unprinted in certain areas for see through to an object or print at or beyond the backside of the lenticular sheet.

FIG. 18 shows a perspective view of a produced lenticular sheet roll 200 having lens arrays 210 in pre-selected areas of the sheet roll 200. The sheet roll 200 is operable for placement into a conventional packing or stamping process, such as a die cut machine. Upon completing the packaging or stamping process, a pre-determined package design is cut from the sheet roll 200. The sheet roll 200 shown in FIG. 18, also shows a pre-determined package design 212 which will be cut from the sheet roll 200 and formed in a final product package 220 (FIG. 19). As seen in FIG. 19, once the package design 212 is cut from the sheet roll 200 and formed in the final product 220, a viewer can easily view an image behind the lenses 14 exhibiting the desired visual effect. Further, a viewer can view a product 222 or other information within the package 220 through the un-embossed portions 224 of the package 220.

The foregoing is a description of various embodiments of the invention that are provided here by way of example only. Although the method for producing the lenticular sheet having high clarity lenses in pre-selected areas has been described with reference to preferred embodiments and examples thereof, other embodiments and examples may perform similar functions and/or achieve similar results. All such equivalent embodiments and examples are within the spirit and scope of the present invention and are intended to be covered by the appended claims. Although specific terms are employed herein, they are used in a generic and descriptive sense only and not for purposes of limitation.

What is claimed is:

1. A method of producing a package from a lenticular sheet having anisotropic optical properties comprising the steps of:

providing a substrate of transparent material having a first side and a second side and an index of refraction greater than one;

forming at least one lens pattern having a plurality of lenses on the first side of the substrate in pre-selected portions thereof, wherein a desired optical effect is produced in the pre-selected portions only; and forming a pre-determined package design from the substrate;

wherein the remainder of the first side of the substrate is unaltered, wherein the step of forming the at least one lens pattern further comprises the steps of:

engraving a plate or cylinder with a desired lens pattern;

removing undesired portions of the lens pattern from the plate or cylinder using a gravure engraving process; and using the resulting plate or cylinder in an extrusion embossment process such that the substrate can be embossed with the remaining lens pattern.

2. The method of claim 1, wherein the plurality of lenses comprises two or more different types of lens patterns.

3. The method of claim 1, wherein said sheet can be reverse printed by lithography, gravure, flexography, ink jet or screen.

4. The method of claim 1, wherein said substrate can be produced from any clear plastic sheet consisting of polyester, polycarbonate, acrylic, polyolefin, polyvinyl chloride or any energy cured thermo set resin.

5. A method of producing a package from a lenticular sheet having anisotropic optical properties comprising the steps of:

providing a substrate of transparent material having a first side and a second side and an index of refraction greater than one;

forming at least one lens pattern having a plurality of lenses on the first side of the substrate in pre-selected portions thereof, wherein a desired optical effect is produced in the pre-selected portions only; and forming a pre-determined package design from the substrate;

wherein the remainder of the first side of the substrate is unaltered, wherein the step of forming at least one lens pattern further comprises the steps of: engraving a plate or cylinder with a desired lens pattern; masking desired portions of the engraved plate or cylinder; electroplating the plate or cylinder with a metal; cutting back the electroplated metal to a desired level; removing the masking from the desired lens pattern; and using the resulting plate or cylinder in an extrusion embossment process such that the substrate can be embossed with the remaining lens pattern.

6. The method of claim 5, wherein the plurality of lenses comprises two or more different types of lens patterns.

7. The method of claim 5, wherein said sheet can be reverse printed by lithography, gravure, flexography, ink jet or screen.

8. The method of claim 5, wherein said substrate can be produced from any clear plastic sheet consisting of polyester, polycarbonate, acrylic, polyolefin, polyvinyl chloride or any energy cured thermo set resin.

9. The method of claim 5, wherein the smooth areas are delustered by chemical etching or patterned by mechanical means.

10. The method of claim 5, wherein the plating in the smooth areas is cut to a level higher than a selected lens area to provide a thinner plastic sheet in the smooth areas.

11. The method of claim 5, wherein the plating in the smooth areas is cut to a level lower than a selected lens area to give a thicker plastic sheet in the smooth areas.

12. The method of claim 5, further comprising the step of engraving register marks and bands into the cylinder or plate for use in slitting, sheeting and reverse printing the sheet.

13. A method of manufacturing a package from lenticular sheet comprises the steps of:

engraving a desired lens pattern into a surface metal of a flat metal plate or a cylinder, wherein the surface metal of the plate or cylinder in which the pattern is engraved into is loosely bonded to a base thereof and can be removed to become an engraved metal shell;

cutting the engraved metal shell to the desired shape; and fastening the metal shell to the cylinder or plate to be used to produce the transparent patterned sheet such that the lens pattern runs along a pre-selected direction; and forming a pre-determined package design from the lenticular sheet.

14. The method of claim 13, wherein the lens pattern comprises two or more different types of patterns.

* * * * *